United States Patent Office 3,313,606
Patented Apr. 11, 1967

3,313,606
LIQUID HYDROCARBON STORAGE
Lazzaro Alfredo Greguoli, Milan, Italy, assignor of two-thirds to Renato Donati and Danilo Preti, both of Rome, Italy
No Drawing. Filed Feb. 14, 1966, Ser. No. 527,094
Claims priority, application Italy, Oct. 30, 1958, 597,055/58, 598,383/58
11 Claims. (Cl. 44—7)

The present application is a continuation-in-part application of application Ser. No. 847,077, filed Oct. 19, 1959, now abandoned.

The present invention relates to a composition containing a liquid hydrocarbon, e.g. gasoline, in a solid mass in such a manner that the liquid hydrocarobn can be stored for a long period of time without any appreciable loss, e.g. by evaporation, of the liquid hydrocarbon.

Storage and transportation of liquid hydrocarbons has been a serious problem for a long period of time and a great deal of research has been conducted in the search for an adequate way in which to store and transport liquid hydrocarbon, particularly liquid fuels such as gasoline and the like.

Among the many methods studied to accomplish storage and transportation of liquid fuels, the one which has probably been studied the most is the method whereby liquid fuels are treated to give thickened or solid products.

In these prior methods usually a formaldehyde-urea resin was used to form the cellular mass entrapping the gasoline. However, this particular composition has not been found to be entirely satisfactory, since, inter alia, the composition is brittle, is not shock resistant and has a very low retention value. Moreover, this type of composition will release the entrapped gasoline when subject to relatively low pressures and when subject to continuous vibration.

In order to have a satisfactory solid product containing liquid fuel the chemical and physical properties of the liquid fuel must not be altered, the product must be fire resistant and shock resistant and able to withstand high temperatures, and losses of the liquid fuel due to, e.g. evaporation, must be at a minimum. Additionally, the liquid fuel must be easily obtainable in the free state from the solid product.

The primary object of the present invention is the embodiment of a composition for storing liquid fuels which fulfills the enumerated desiderata.

More particularly, it is an object of the present invention to embody a composition in which liquid fuels are contained in a cellular mass, said composition being highly resistant to flame, not affected by temperature changes, and with no loss of liquid fuel to the outside atmosphere by evaporation, even when the liquid fuel is highly volatile.

Another object of the present invention is the embodiment of a composition wherein gasoline can be stored for long periods of time without any alteration of its original properties. For example, the specific gravity, octane rating, resistance to gum formation, etc., should all be unchanged.

A further object of the present invention is the embodiment of a cellular mass containing liquid fuels in which the cellular mass can be prepared at temperatures less than 40° C.

Other objects of the present invention will be apparent from the following description.

Briefly stated, the present invention essentially realizes the aforementioned objects by the use of a particular type of resin, which will be described more fully hereinafter. The resin does not have plasticizers or acidic substances in the free state. All of the resin components are chemically inert to liquid hydrocarbons and, therefore, the resin does not alter the original properties of the liquid hydrocarbons. Additionally, the resin during the condensation reaction, wherein the resin is hardened, must not react with the liquid hydrocarbons which are being entrapped therein.

The present invention is founded, inter alia, on the discovery that the phenol and melamine type resins are much more effective as cellular masses to entrap liquid hydrocarbons, more particularly, liquid fuels such as gasoline, than urea-formaldehyde resins.

The particular type of resins used in this invention are the condensation product of formaldehyde and its various forms such as formalin, paraformaldehyde, hexamethylenetetramine, trioxane, with either melamine or a phenol or mixtures thereof. By phenol, as used in this specification, is meant an hydroxy substituted benzene such as phenol and resorcinol.

Preferably, the mole ratio of formaldehyde to melamine or phenol is about 1:1 to 8:1. Of course, any resin of this invention must be soluble in water but insoluble in the particular liquid hydrocarbon entrapped therein.

Another type of resin which is very useful in the instant invention is one in which one of the above-named resins, e.g. a formaldehyde-melamine resin, is admixed with an acrylic resin, i.e. an acrylate or methacrylate resin such as poly(methyl methacrylate). The weight ratio of acrylate resin to formaldehyde resin is not particularly critical but is preferably from 1:1 to 1:6. The acrylic resin is useful since it increases the resistance of the solidified mass and also increases the stability of the final product against the atmosphere, heat and water.

However, it should be emphasized that the particular ratio of formaldehyde to melamine or phenol is of no moment providing the condensation product is water soluble but insoluble in, e.g. gasoline.

The above-described resin must contain a plasticizer. The plasticizer can either be a proteinous material (e.g. albumin, glutin, casein, fibroin, globulins) or, more preferably, a polyalcohol such as hexahydric alcohol. Hexahydric alcohol is both a plasticizer and an emulsion adjuvant. The proteinous materials, particularly casein, require considerable percentages of water and by the time this moisture evaporates the casein ceases to perform the important plasticizing action. This sometimes causes certain difficulties, such as, an excessive stiffness of blocks and the cells which retain the gasoline and leaks easily occur or even cracks in the blocks.

The hexahydric alcohol does not evaporate or migrate easily. It is a liquid product which does not change with the time. Hexahydric alcohol is quite insoluble in hydrocarbons; on the contrary it acts as a solvent and plasticizes the resins.

The plasticizers mentioned supra, viz. the proteinous materials and hexahydric alcohol, must be present in the resin in an amount of at least 10%, based on the total weight of the resin. Preferably, the amount of the plasticizer is between 10%–50%.

After the resin is formed with the plasticizer admixed therewith, it is dissolved in water and the thus-formed solution is admixed with a hardening accelerator, known per se, e.g. ammonium formate and/or hexamethylenetetramine and the resulting homogeneous mixture is homogenized with the liquid hydrocarbon. The so-obtained product is then sealed into a plastic bag and allowed to harden which requires about twenty-four hours.

The amount of hardening accelerator in the resin solution varies depending upon the particular type of resin and the desired hardness; however, the particular amount can easily be determined. Preferably, the amount of hardening accelerator is between 1 to 10% based on the weight of the resin.

The following examples represent presently preferred embodiments. All percentages are parts by weight unless otherwise indicated.

Example I

A phenolic resin is prepared by condensing at 100° C. the following components in which the parts are by weight:

| | Parts |
|---|---|
| Resorcinal | 15 |
| Phenol | 45 |
| Formaldehyde | 90–95 |

The pH is maintained at 7 by ammonia.

100 grams of the so-obtained resin which is a liquid phenolic resin in the resol stage (A) is mixed at ambient temperature with 10 grams of hexahydric alcohol and 12 grams of an emulsion adjuvant (aluminum stearate). Any water present is removed by evaporation and the thus-obtained mixture is carefully mixed with a stirrer. While mixing a continuous stream of 1,200 grams of gasoline were added. After a homogeneous mixture is obtained 2 grams of 1:10 hydrochloric acid solution is slowly poured into the homogeneous mass. The mass hardens in a short time entrapping the gasoline.

Example II

A phenolic resin as in Example I is prepared. To 100 grams of the liquid phenolic resin is added 15 grams of hexahydric alcohol and 30 grams of water. The thus-obtained mixture is homogenized and then 10 grams of aluminum sulfate are added. After further homogenization 1,250 grams of gasoline are added as a continuous stream. The gasoline mixture is homogenized and 10 grams of alkaline catalyst (1:5 solution) are added. The mass hardens in a short time entrapping the gasoline.

Example III

A melamine resin is prepared by condensing one mole of melamine with four moles of formaldehyde (as a solution containing 35% by volume of HCHO) at a temperature of 70° C. and a pH of 8. 85 grams of the thus-obtained resin is then mixed with 30 grams of hexahydric alcohol, 10 grams of polyvinyl alcohol and 20 grams of water. To the homogenized mixture 1,400 grams of gasoline are added as a continuous stream. A hardening accelerator is added (2 grams of sulfuric acid and 3 grams of ammonium sulfate). The mass hardens in a short time entrapping the gasoline.

Example IV 85 grams of the melamine prepared as described in Example III is mixed with 15 grams of linear poly(methyl methacrylate) at ambient temperature. The product produced is highly stable since there is a molecular linkage. It is also soluble in water. 100 grams of the melamine-acrylic resin is admixed with 50 grams of water, 30 grams of hexahydric alcohol and 10 grams of aluminum stearate. To the thus-obtained homogenized mixture is added 1,200 grams of gasoline. After homogenization there is added 0.02 gram of benzoyl peroxide in 4 grams of dibutyl phthalate. The mass hardens shortly entrapping the gasoline.

Example V

A mixture is formed with:

| | Grams |
|---|---|
| Melamine | 200 |
| Formaldehyde (40% by vol.), pH 7 | 450 |
| Caustic soda 10 Bé. | 15 | heating at 95° C. for at least one hour and cooling to 45° C. Then a mixture is added consisting of:

| | Grams |
|---|---|
| Globulin from "ricinus," (previously sensitized) | 220 |
| Triethanolamine | 20 |
| Water | 200 |

The product is homogenized and dried. To the homogenized mass is added 1,200 grams of gasoline. To the thus-obtained homogenized mixture there is added 2 grams of sulfuric acid and 3 grams of ammonium sulfate.

If desired the above-obtained product, as well as the products of the other examples are poured into polyvinylchloride bags and the mouth of the bags then welded.

Having thus disclosed the invention what is claimed is:

1. A solidifiable gasoline mixture consisting essentially of
    (I) a mixture of (a) a resin condensation product of (1) formaldehyde with (2) at least one formaldehyde-condensable member selected from the group consisting of phenol and melamine; (b) a plasticizing compound selected from the group consisting of protein and hexahydric alcohol in an amount of at least 10 parts by weight per 100 parts by weight of said resin condensation product and (c) hardening accelerator in an amount of from about 1 to about 10% based on the weight of resin condensation product; and
    (II) gasoline homogenized with (I).

2. A solidifiable gasoline mixture consisting essentially of
    (I) a mixture of (a) a resin product of (1) the condensation product of formaldehyde and melamine and (2) linear acrylic polymer; (b) a plasticizing compound selected from the group consisting of protein and hexahydric alcohol in an amount of at least 10 parts by weight per 100 parts by weight of component (a), and (c) hardening accelerator in an amount of from about 1 to about 10% based on the weight of the resin product; and
    (II) gasoline homogenized with (I).

3. A solidifiable gasoline mixture according to claim 1 wherein the plasticizing compound is hexahydric alcohol.

4. A solidifiable gasoline mixture according to claim 2 wherein the plasticizing compound is hexahydric alcohol.

5. A solidifiable gasoline mixture according to claim 1 wherein the plasticizing compound is globulin.

6. A solidifiable gasoline mixture according to claim 2 wherein the plasticizing compound is globulin.

7. A solidifiable gasoline mixture according to claim 1 wherein the mole ratio of formaldehyde to formaldehyde-condensable member is about 1:1 to 8:1.

8. A solidifiable gasoline mixture according to claim 2 wherein the weight ratio of said condensation product of formaldehyde and melamine to said linear acrylic polymer is from 1:1 to 1:6.

9. A solidifiable gasoline mixture according to claim 8 wherein the mole ratio of formaldehyde to melamine is 1:1 to 8:1.

10. A solidifiable gasoline mixture according to claim 8 wherein the mole ratio of formaldehyde to melamine is about 4:1.

11. A solidifiable gasoline mixture according to claim 10 wherein the plasticizing compound is hexahydric alcohol.

References Cited by the Examiner

UNITED STATES PATENTS

| 1,262,808 | 4/1918 | Keyt | 44—7 |
| 2,378,365 | 6/1945 | Swain et al. | 260—856 |
| 2,754,335 | 7/1956 | Bender et al. | 260—57 X |

FOREIGN PATENTS

| 211,518 | 11/1957 | Australia. |
| 589,594 | 6/1947 | Great Britain. |

OTHER REFERENCES

Drumm et al.: Cross Linking of a Phenol-Formaldehyde Novolac, Ind. and Eng. Chem., volume 48, No. 1, January 1956, pages 76–81.

DANIEL E. WYMAN, Primary Examiner.

C. F. DEES, Assistant Examiner.